United States Patent
Fischer et al.

(10) Patent No.: US 10,500,779 B2
(45) Date of Patent: Dec. 10, 2019

(54) CALIBRATION DEVICE, CALIBRATION METHOD AND METHOD FOR MANUFACTURING A CALIBRATION DEVICE

(71) Applicant: GREINER TOOL.TEC GMBH, Nussbach (AT)

(72) Inventors: Bernhard Fischer, Wartberg (AT); Gerhard Anders, Ried (AT); Leopold Weiermayer, Wartberg (AT); Erwin Krumböck, Ansfelden (AT)

(73) Assignee: GREINER TOOL. TEC GMBH, Nussbach (AT)

( * ) Notice: Subject to any disclaimer, the term of this patent is extended or adjusted under 35 U.S.C. 154(b) by 208 days.

(21) Appl. No.: 14/893,507

(22) PCT Filed: May 23, 2014

(86) PCT No.: PCT/EP2014/060682
§ 371 (c)(1),
(2) Date: Nov. 23, 2015

(87) PCT Pub. No.: WO2014/187966
PCT Pub. Date: Nov. 27, 2014

(65) Prior Publication Data
US 2016/0107364 A1    Apr. 21, 2016

(30) Foreign Application Priority Data
May 24, 2013    (DE) .......................... 10 2013 209 703

(51) Int. Cl.
*B29C 47/90* (2006.01)
*B29C 48/90* (2019.01)

(52) U.S. Cl.
CPC .......... *B29C 48/908* (2019.02); *B29C 48/903* (2019.02); *B29C 48/905* (2019.02)

(58) Field of Classification Search
CPC . B29C 47/908; B29C 47/0023; B29C 47/905; B29C 47/903; B29C 47/003;
(Continued)

(56) References Cited

U.S. PATENT DOCUMENTS 2,358,929 A * 9/1944 Inslee ................... B21B 21/00
                                                            72/221
4,265,496 A * 5/1981 Kofink ............... F16C 33/6607
                                                            384/397
(Continued)

FOREIGN PATENT DOCUMENTS

CN        202264382 U    6/2012
CN        102601973 A    7/2012
(Continued)

OTHER PUBLICATIONS

Oberg, Erik Jones, Franklin D. Horton, Holbrook L. Ryffel, Henry H.. (2012). Machinery's Handbook (29th Edition) & Guide to Machinery's Handbook. Industrial Press. Retrieved from https://app.knovel.com/hotlink/toc/id:kpMHEGMH24/machinerys-handbook-29th/machinerys-handbook-29th (Year: 2012).*

(Continued)

*Primary Examiner* — Galen H Hauth
(74) *Attorney, Agent, or Firm* — Maschoff Brennan

(57) ABSTRACT

A calibration device for a calibration, in particular wet calibration of an extrusion device is provided. The calibration device comprises a calibrating element which includes an opening for guiding through a profile produced by means of an extrusion die of the extrusion device and at least one rotatable guide roller which is in contact with the profile when the profile is guided through the opening. The calibration device further comprises at least one separate bearing element insertable into a cutout of the calibrating element, via which the guide roller can rotatably be mounted on the calibrating element.

16 Claims, 6 Drawing Sheets

(58) Field of Classification Search
CPC .............. B29C 47/904; B29C 47/8865; B29C 47/8835; B29C 47/8895; B29C 47/0818; B29C 47/0028
See application file for complete search history.

(56) References Cited

U.S. PATENT DOCUMENTS

| | | | | |
|---|---|---|---|---|
| 4,612,683 A | * | 9/1986 | Holz | ........................ A22C 9/004 100/176 |
| 4,936,697 A | * | 6/1990 | Weller | ...................... B41J 11/04 400/144.2 |
| 5,248,372 A | * | 9/1993 | McNamee | ............. C23G 3/021 134/122 R |
| 2006/0034965 A1 | | 2/2006 | Ulrich et al. | |

FOREIGN PATENT DOCUMENTS

| | | |
|---|---|---|
| CN | 102962979 A | 3/2013 |
| DE | 41 29 881 A1 | 4/1993 |
| DE | 198 43 340 A1 | 4/2000 |
| DE | 203 20 348 U1 | 6/2004 |
| DE | 10 2012 218 140 A1 | 4/2014 |
| EP | 1 201 398 A1 | 5/2002 |
| KR | 10-0730641 B1 | 6/2007 |
| WO | 2012/173327 A1 | 12/2012 |

OTHER PUBLICATIONS

CN Office Action dated Oct. 28, 2016 as received in Application No. 201480030028.8 (English Translation).
European Search Report dated Jun. 24, 2019 as received in Application No. 14 732 507.0.

* cited by examiner

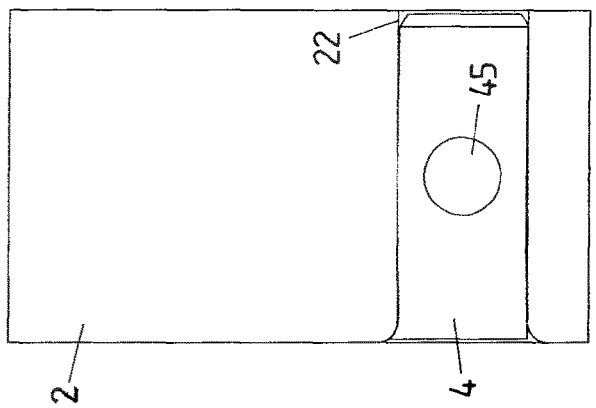
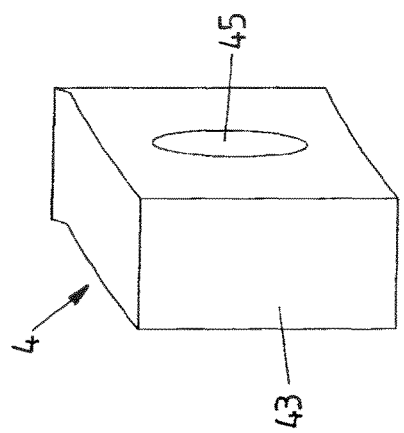
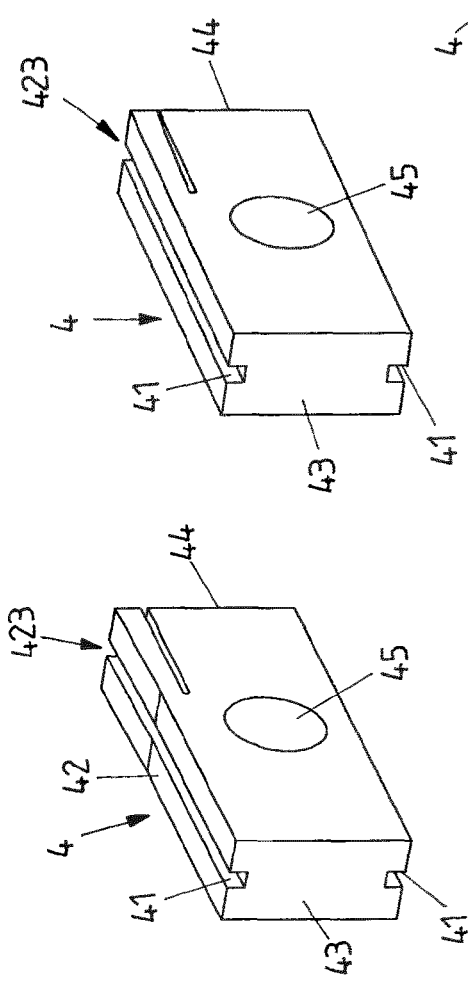
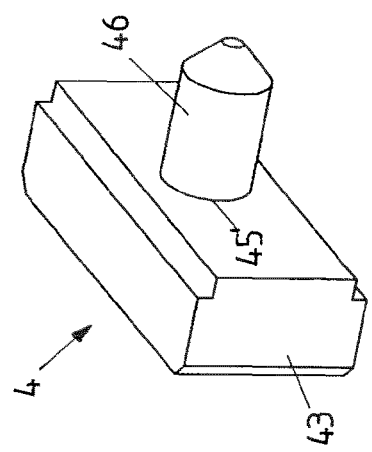

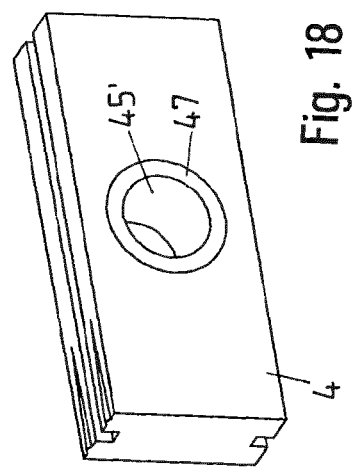
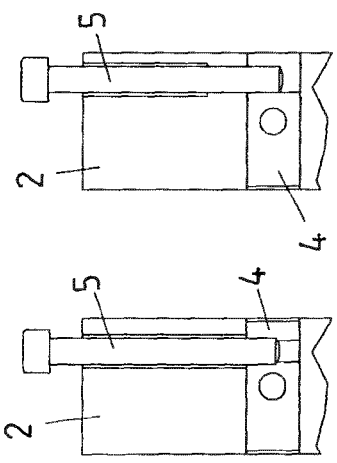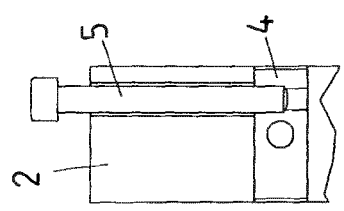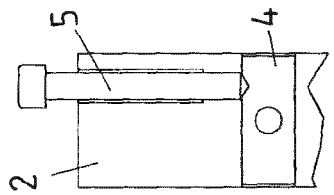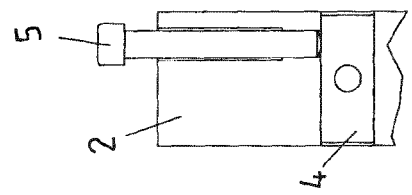

CALIBRATION DEVICE, CALIBRATION METHOD AND METHOD FOR MANUFACTURING A CALIBRATION DEVICE

CROSS-REFERENCE TO A RELATED APPLICATION

This application is a National Phase Patent Application of International Patent Application Number PCT/EP2014/060682, filed on May 23, 2014, which claims priority of German Patent Application Number 10 2013 209 703.4, filed on May 24, 2013.

BACKGROUND

This invention relates to a calibration device, a calibration method and a method for manufacturing a calibration device.

Plastic profiles of thermoplastic materials in particular are manufactured by means of extrusion. For shaping a plastic profile a nozzle and a so-called calibration unit are used.

Calibration units for the manufacture of plastic profiles, e.g. window profiles, usually include a dry and a wet calibration device, wherein after exit from the nozzle the hot extrudate first passes through the dry calibration device and subsequently through the wet calibration device. At the end of the calibration and after complete cooling of the plastic profile to room temperature, the plastic profile must have the desired contour.

The wet calibration device includes e.g. several vacuum tanks arranged in series for largely cooling the plastic profile, after the same has already partly been cooled in the dry calibration device. In the wet calibration device, calibrating elements (so-called short calibrators or covers) are arranged at intervals from about 100 mm on the inlet side to about 500 mm on the outlet side, which each have a through opening which largely corresponds to the geometry of the plastic profile.

The vacuum tanks in principle are closed on all sides and only at the end faces have openings for the entry and exit of the plastic profile. The vacuum tanks are charged with negative pressure in an order of magnitude about 30 to 200 mbar, whereby the plastic profile is slightly "bloated" and attaches to the through openings of the calibrating elements.

The plastic profile thus cools down in a defined shape, so that the dimensional stability is ensured. The cooling water flows through the vacuum tanks proceeding from few supply lines down to few discharge lines. The negative pressure in the vacuum tanks only must be applied via a negative pressure port and then acts in all vacuum tank interior spaces.

The manufacturing effort for the calibrating elements is comparatively low, because the same do not require any supply and distribution bores for negative pressure and cooling water.

The dry calibration device upstream of the wet calibration device includes up to eight calibrating elements. These calibrating elements each include running surfaces which approximately correspond to the contour of the plastic profile. In detail, however, dimensional or geometrical differences do exist, in order to follow the reduction in length with decreasing temperature of the plastic and in order to compensate the distortion as a result of different cooling rates.

In particular in the region of the vacuum tanks, the plastic profile has direct contact with the cooling water. Particles from the cooling water, e.g. sand or lime particles, can be deposited on the sensitive running surfaces of the calibrating elements or on their inlet edge, whereby scratches then are produced on the plastic profile surface. Such scratches chiefly are disturbing at the visible surfaces of plastic profiles. These are those surfaces of the plastic profiles which e.g. in the completely mounted window are oriented inwards into the room or outwards into the open air.

Experience shows that the cooling water frequently is contaminated by organic and/or inorganic impurities (e.g. particles) as a result of the comparatively long duration of use in the extrusion system. This is apparent from the fact that the cooling water mostly is slightly to strongly turbid.

The patent application DE 10 2012 218 140.7 dated Apr. 10, 2012 of the same applicant discloses that the sensitive visible surfaces of a profile in the vacuum tank can be supported by guide elements in the form of rollers. In so far, reference is made herewith expressly to DE 10 2012 218 140.7.

Dirt particles from the cooling water, which get into the gap between roller and profile surface and are deposited there, therefore cannot produce any long scratches, but at best a unique impression. After "rolling through" the gap, the particles then generally again remain in the cooling water.

Since the rollers are not driven or because a drive would be very expensive, it is very important that the rollers run smoothly, so that they do not stand still and then all the more lead to scratches. The rollers therefore must have a rather low-friction bearing which in the given environment, such as more or less polluted water and very cramped space conditions, prevents stopping of the rollers as reliably as possible and which e.g. also allows an exact positioning of the roller.

SUMMARY

It is a problem underlying the present invention to indicate a rather inexpensive and yet reliable possibility to avoid damages of an extruded profile during the calibration process.

This problem is solved by the calibration device with the features as described herein, by the calibration method with the features as described herein and by the method with the features as described herein.

Accordingly, there is provided a calibration device for a calibration, in particular a wet calibration, of an extrusion device, comprising
  a calibrating element (for example in the form of a short caliber plate or a cover), which includes an opening for guiding through a profile produced by means of an extrusion die of the extrusion device;
  at least one rotatable guide element in the form of a guide roller, which is in contact with the profile when the profile is guided through the opening, wherein
  at least one separate bearing element insertable (in particular with a precise fit) into a recess (e.g. formed in the manner of a cutout) of the calibrating element, via which the guide element is rotatably mountable on the calibrating element.

The guide roller is rotatably mounted on the calibrating element e.g. via two bearing elements facing each other along its axis of rotation, which each are arranged in a recess of the calibrating element.

The outer surface of such guide roller is not necessarily designed cylindrical, but also can have an e.g. bulbous (convex) shape. An (at least slightly) convex shape of the roller leads to a desired slight impression (i.e. a concave deformation) of a flat visible surface of the profile during the cooling operation after the extrusion. Only after complete cooling, a largely flat surface will then be formed.

The fact that the guide roller is not mounted directly on the calibrating element, but via the separate (i.e. separately fabricated) bearing element, for example can have the advantage that the material of the bearing element can be chosen independently of the material of the calibrating element; see below.

As already mentioned above, the calibration in particular serves for calibrating extruded profiles, in particular plastic profiles (such as window profiles).

The cutout in particular extends from an end face to be turned towards the extrusion die up to an end face of the calibrating element to be turned away from the extrusion die, i.e. the cutout completely extends through the calibrating element in direction of extrusion. The bearing element correspondingly can be inserted into the calibrating element by being pushed into the cutout along a direction vertical to the end faces of the calibrating element.

The bearing element in particular realizes a plain bearing, wherein it in particular is positively and/or non-positively fixed at the calibrating element; in particular such that shifting of the bearing elements in direction of the direction of movement of the profile (i.e. along its longitudinal direction, subsequently referred to as direction of extrusion) is counteracted or such shifting is prevented entirely.

For example, the bearing element includes at least one wedge-shaped structure (such as in the manner of a rib protruding from the remaining bearing element to the outside), which can cooperate with a boundary surface of the cutout (i.e. a surface of the calibrating element delimiting the cutout) such that it non-positively fixes (clamps) the bearing element at the calibrating element. The wedge-shaped structure e.g. extends along the entire length (measured in direction of extrusion of the profile after insertion of the bearing element into the cutout of the calibrating element) of the bearing element. It is of course also conceivable that the wedge-shaped structure only extends along a part of the length of the bearing element. For example, the wedge-shaped structure (or the plurality of wedge-shaped structures) is formed only at one end, namely in particular at the end of the bearing element facing the extrusion die.

According to another aspect of the invention, the bearing element is formed slightly curved in longitudinal direction (i.e. the apex of the curvature points in a direction transverse to the longitudinal direction of the bearing element), so that with one portion of a first long side and with two portions of a second long side, which is opposed to the first long side, it can rest against the boundary surfaces of the cutout such that the bearing element is non-positively fixed at the calibrating element.

In particular, the bearing element extends (e.g. only slightly) curved in the manner of an arc. i.e. the curvature extends along the entire length of the bearing element. When such bearing element is arranged (pushed in) in a prismatic groove, the bearing element rests against insides of the groove in particular along three lines, namely with the first long side along a line which extends in the region of the apex of the curvature (which e.g. is located in the middle of the long side of the bearing element) and with the second long side along two further lines which extend in the region of a first end (facing the extrusion die) and in the region of a second end (facing away from the extrusion die).

In particular, the width of the groove is slightly smaller than the corresponding largest width (i.e. the distance between the region of the maximum and minimum deflection) of the bearing element, so that on insertion into the groove the bearing element is bent up so to speak (i.e. its radius of curvature is increased) and thus is pretensioned against the inside of the groove.

It is also conceivable that the bearing element includes at least one stop (such as in the form of a longitudinal stop) which can cooperate with an inlet edge and/or a boundary surface of the cutout such that it positively secures the bearing element against being shifted in direction of extrusion. In particular, the stop is formed at the end of the bearing element facing the extrusion die (i.e. disposed upstream with respect to the direction of extrusion; for example on an end face of this end), so that a rather accurate axial positioning of the bearing element with respect to the calibrating element is ensured.

According to a further variant of the invention, the calibrating element includes at least one stop via which the bearing element can positively be secured against being shifted in the direction of movement of the profile. The stop is provided e.g. at an end of the cutout facing away from the extrusion die (for example on an end face of the calibrating element).

It also is possible that the bearing element includes a resilient portion which can cooperate with a boundary surface of the cutout such that it non-positively fixes the bearing element at the calibrating element. For example, the resilient portion is formed e.g. in the form of a resilient tongue which after insertion of the bearing element into the cutout urges against a boundary surface (fit surface) of the cutout.

Alternatively or in addition, the calibrating element also can include a resilient portion (such as a resilient tongue), which can act on the bearing element such that the bearing element is non-positively fixed at the calibrating element.

In addition, the calibration device according to the invention also can comprise a fastening element penetrating the calibrating element down to the cutout, via which the bearing element can be fixed at the calibrating element. For example, the fastening element (e.g. formed as screw or bolt) with one portion—as seen in direction of extrusion of the profile—extends behind the bearing element (so that with its end face it can cooperate with the end facing away from the extrusion die), bluntly urges against the bearing element (against a long side), protrudes into a counterbore of the bearing element or can be screwed into a threaded bore of the bearing element.

According to another development of the invention, at least one trunnion is integrally molded to the guide roller or a bearing pin is inserted therein, via which the guide roller is mountable on the bearing element. The trunnion or the bearing pin in particular engages into a corresponding bore of the bearing element or into a sleeve inserted into a bore of the bearing element.

It also is conceivable that a trunnion (e.g. cylindrical) is integrally molded to the bearing element or a bearing pin is inserted, wherein the trunnion or the bearing pin in particular engages into a bore of the guide roller or into a sleeve inserted into a bore of the guide roller. The respective bores are countersunk into the two end faces of the guide roller coaxially to its axis of rotation.

Between the trunnion (provided on the guide roller or the bearing element) and the bearing bore (correspondingly formed inversely on the bearing element or the guide roller) there need not necessarily be a close fit, but there can also be a distinct difference between the outside diameter of the trunnion and the inside diameter of the bearing bore; e.g. outside diameter of trunnion: 4.0 mm and inside diameter of bearing bore: 4.5 mm.

In operation of the calibration device the guide pin is running "on contact" in the larger bore as a result of the force acting on the rotatable guide roller, wherein the effective position of the bearing element correspondingly is offset vertically depending on the difference in diameter. During the assembly of the two bearing elements usually employed for supporting the guide roller, this large bearing play allows "tilting" of the guide roller more strongly, when the two bearing elements are pushed into the cutouts in the calibrating element not exactly synchronously, so that the bearing components (trunnion, bearing bore) on both sides of the guide roller are not damaged due to canting. In addition, small particles from the surrounding cooling water do not lead to jamming and blocking of the guide roller, as would be the case with a comparatively narrow bearing gap (i.e. small difference between the outside diameter of the trunnion and the inside diameter of the bearing bore).

The bearing bore in the bearing element can be provided at different vertical positions, whereby different vertical positions of the guide roller are effected. For example, a plurality of bearing elements with different "eccentric dimensions" (i.e. vertical positions) can be kept on stock; e.g. with the dimensions (vertical offset)+/−0 mm; +0.2 mm; +0.4 mm and +0.6 mm. Since the bearing elements preferably are designed symmetrically about a vertical center plane, the same can both be inserted into a cutout formed to the left of the guide roller as seen in direction of extrusion and into a cutout located to the right of the guide roller and also be oriented upwards and downwards with respect to the eccentric dimensions (i.e. rotated about the longitudinal axis by 180°). Four different designs of the bearing element therefore permit a vertical adjustment of the rollers in the range of +/−0.6 mm in steps of 0.2 mm, which can replace most of the otherwise required mechanical rework.

For example, one part of the bearing element and/or one part of the guide roller is formed of a metal or a plastic material different from the base material. Such part e.g. is the above-mentioned bearing pin or the likewise mentioned sleeve. It is conceivable that the part serving for support is formed of another material than the bearing element or the guide roller, so that a particularly low-friction and/or wear-resistant material pairing can be employed.

For example, the parts serving for support as mentioned above are a bearing pin and/or a sleeve arranged in a bore, wherein the material of the bearing pin or the sleeve in particular is different from the material of which the guide roller and the bearing element are formed. In particular, the part of the bearing element (e.g. guide pin or sleeve) which in operation experiences a "linear load" is formed of a sintered metal alloy or a sintered hard metal, so that the wear is reduced. In operation, the corresponding part of the guide roller (the bearing sleeve or the bearing pin) experiences a "circumferential load", so that the wear is effective on a larger surface and therefore dimensionally has less influence, whereby this part can be made of a less wear-resistant material.

The invention also relates to a calibration method for calibrating profiles, in particular plastic profiles, by using a calibration device as described above, wherein a profile produced by means of an extrusion die of an extrusion device is guided through an opening of the calibrating element, so that the rotatable guide roller of the calibration device is in contact with the profile.

In a further aspect, the invention also relates to a method for manufacturing a calibration device according to any of the preceding claims, with the following steps:
   providing a calibrating element which includes an opening for guiding through a profile produced by means of the extrusion device;
   providing at least one rotatable guide roller which is in contact with the profile when the profile is guided through the opening, and
   inserting a bearing element via which the guide roller is rotatably mountable on the calibrating element into a cutout of the calibrating element.

The guide roller and the bearing element in particular are formed as described above.

It is possible that several different bearing elements are provided, which define different vertical positions of the axis of rotation of the guide roller relative to the calibrating element, and one of the bearing elements is selected and inserted into the cutout of the calibrating element.

For example, the bearing elements include differently positioned bearing bores or trunnions. In particular, the bearing bores or trunnions are formed with a different vertical offset, as already mentioned above. In particular, it is conceivable that bearing elements with a vertical offset of the bearing bore or the trunnion (based on a central position) of +/−0 mm; +0.2 mm; +0.4 mm and +0.6 mm are provided.

BRIEF DESCRIPTION OF THE DRAWINGS

The invention will subsequently be explained in detail by means of exemplary embodiments with reference to the Figures.

FIG. 9 shows a further modification of the bearing element of FIG. 6.

FIG. 10 shows the bearing element of FIG. 9 in the deformed condition of the resilient tongue.

FIG. 11 shows another modification of the bearing element, according to which it extends curved in longitudinal direction.

FIG. 12 shows the bearing element of FIG. 11 after insertion into the cutout of the calibrating element.

FIG. 13 shows a further embodiment of the bearing element.

FIGS. 17A to D show further possibilities of the fixation of a bearing element at a calibrating element.

FIG. 18 shows a further configuration of the bearing element.

DETAILED DESCRIPTION

Figure 1:
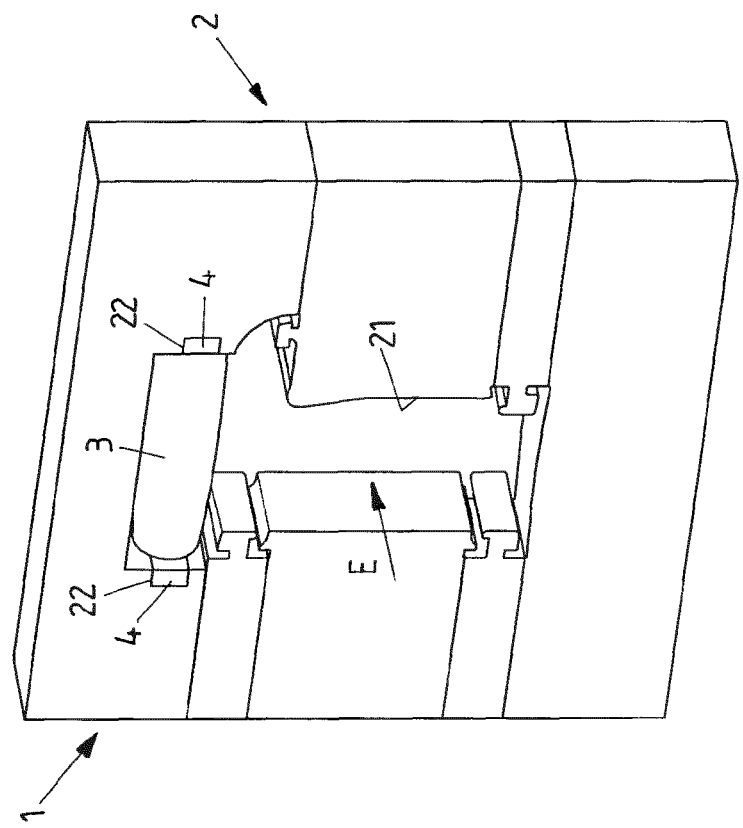
FIG. 1 shows a perspective view of a calibration device according to a first exemplary embodiment of the invention.
Figure 4:
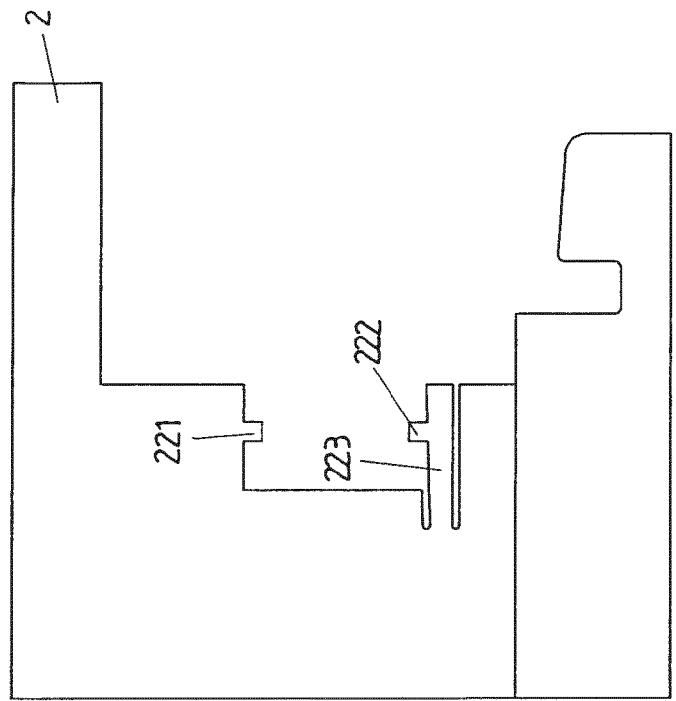
FIG. 4 shows the detail of FIG. 3 without guide roller in a top view and without representation of the chamfer present on the end face.

FIG. 1 shows a calibration device 1 according to the invention with a calibrating element formed as cover 2. The calibration device 1 is used in a calibration unit (in particular a wet calibration unit) of an extrusion device (not shown).

The cover 2 includes a central opening 21 through which a profile produced by extrusion (not shown) is guided during the aftertreatment in the calibration unit. Correspondingly, the opening 21 includes guide surfaces extending in correspondence with the cross-section of the profile. On an upper side, the opening 21 is delimited by a guide element in the form of a guide roller 3.

When guiding the profile through the opening 21 (along the direction of extrusion E), the guide roller 3 rests against an outside of the profile, so that the movement of the profile generates a rotary movement of the guide roller 3. The guide roller 3 thus is a freely rotatable roller which is moved by the moving plastic profile. It also is conceivable that alternatively or in addition to the guide roller 3 a lower guide roller is provided, which hence delimits a lower edge of the opening 21.

When impurities get between the profile and the rotatable guide roller 3, the same are carried along with the rotation of the guide roller 3, so that they at best leave a point-shaped impression on the profile.

The guide roller 3 is not mounted on the cover 2 directly, but via two bearing elements (bearing inserts) 4 which are inserted into correspondingly designed cutouts 22 of the cover 2. The bearing elements 4 e.g. are formed of another material than the cover 2. The cutouts 22 each extend completely through the cover 2 from an end face to be turned towards an extrusion die of the extrusion device up to an end face of the cover 2 to be turned away from the extrusion die.

Figure 2:
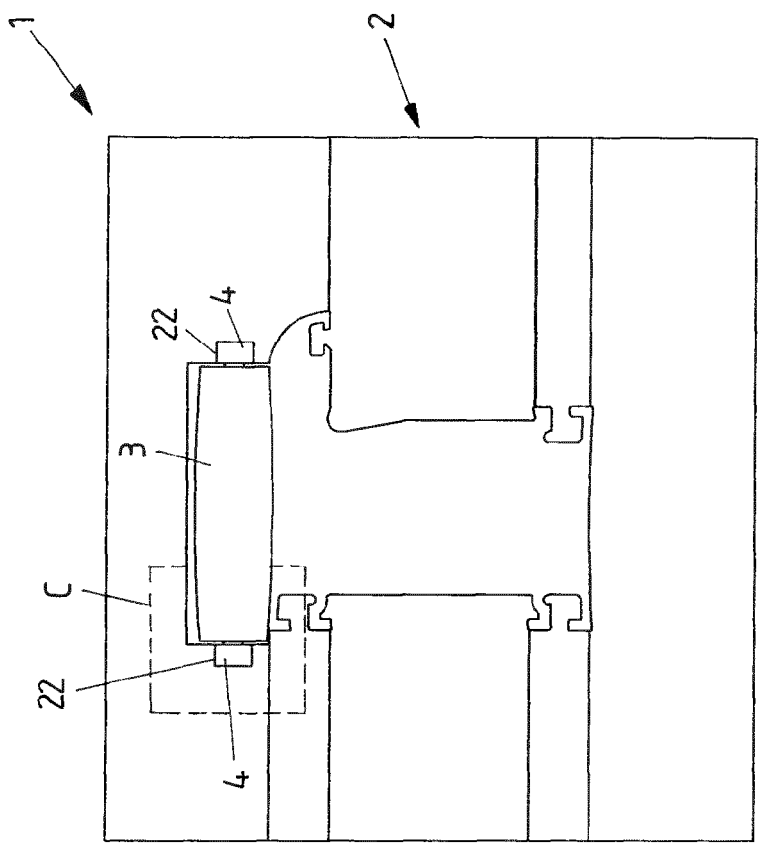
FIG. 2 shows the calibration device of FIG. 1 in a top view.
Figure 3:
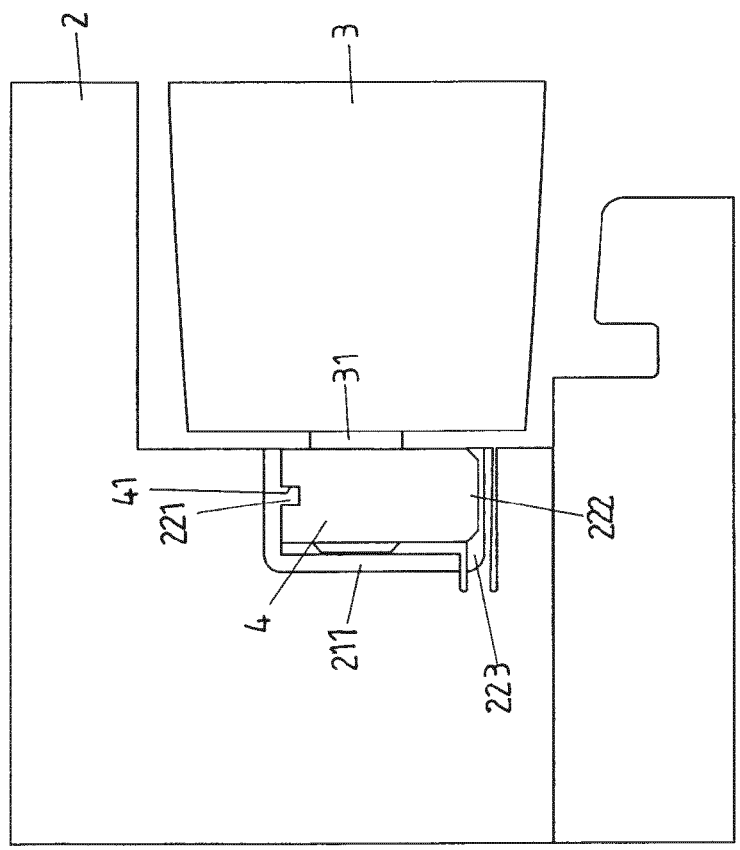
FIG. 3 shows an enlarged detail of the calibration device of FIGS. 1 and 2 in a sectional view.

The support of the guide roller 3 via the bearing elements 4 is shown enlarged in FIG. 3 (corresponding to the region C in FIG. 2). Accordingly, trunnions 31 of the guide roller 3 engage into bores of the bearing elements 4, whereby the rotatable support of the guide roller 3 is realized.

To enable the bearing elements 4 to be reproducibly positioned in the cutouts 22 of the cover 2, the boundary surfaces of the cutouts 22 each include an upper and a lower web-like protrusion 221, 222 (at least approximately rectangular in cross-section), which after insertion of the bearing elements 4 (in direction of extrusion E) into the cutouts 22 engage into corresponding grooves 41 of the bearing elements 4.

In addition, the covers 2 each include a lower edge portion formed as resilient tongue 223, which each is cut free by two horizontal cuts in the covers 2. On insertion of the bearing elements 4 into the cutouts 22, the tongue 223 slightly can flex downwards, which acts as tolerance compensation and simplifies the insertion of the bearing elements 4. For example, the resilient tongue 223 allows a deflection (spring travel), without being deformed permanently, of about +/−0.15 mm (relative to its end pointing towards the guide roller 3). The spring travel provided by the resilient tongue 223 in particular effects that inevitable dimensional fluctuations in the manufacture of the bearing elements 4 have no negative effect on the holding force and a frequent installation and removal of the bearing elements 4 is possible without the mating surfaces (i.e. the outsides of the bearing elements 4 and the insides of the cutouts 22) "wearing out".

In addition, the inlet edge of the opening 21 has a chamfer 211 on the end face facing the extrusion die (not shown) (i.e. on the inlet side relative to the direction of extrusion E), as shown, or a rounding, so that the bearing elements 4 can be attached easily and can then be pushed into the openings 22.

Figure 5:
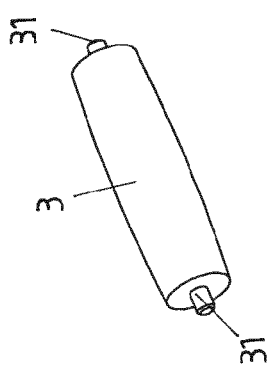
FIG. 5 shows the guide roller of the calibration device of FIGS. 1 to 3 in a perspective representation.

FIG. 5 shows the guide roller 3 of FIGS. 1 and 2. At the ends of the guide roller 3 trunnions 31 are formed as already mentioned above, which each engage into a bearing element 4. For example, the trunnions 31 are formed integrally with the roller 3. It is conceivable that the cover 2 includes vertical boundary surfaces each in the region of the cutouts 22, against which the trunnions 31 can run in axial direction (along the direction of extrusion E) and which thus delimit a movement of the guide roller 3 transversely to the direction of extrusion E.

The outer contour of the guide roller 3 is designed slightly convex (barrel-shaped), in order to initially slightly impress the profile running through the opening 21 of the cover 2, as already explained above.

Figure 6:
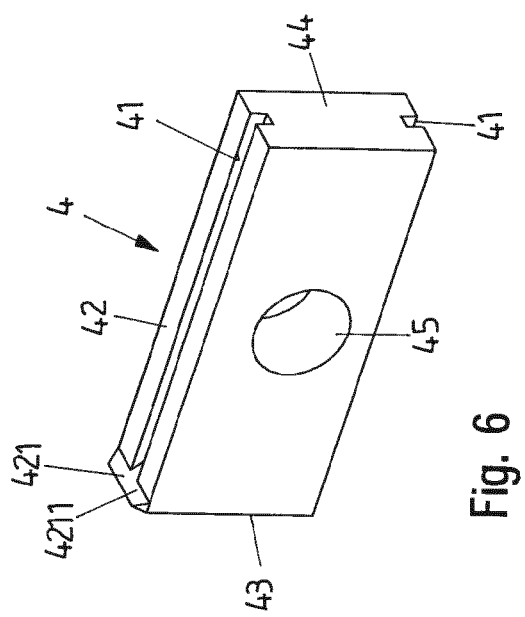
FIG. 6 shows the bearing element of the calibration device of FIGS. 1 to 3 in a perspective representation.

FIG. 6 shows the bearing element 4 of FIGS. 1 to 4. This bearing element 4 is designed substantially prismatic (in particular cuboid) and on one end face 43 (the left one in the Figure) includes a longitudinal stop 421 protruding from an upper surface 42. This longitudinal stop 421 cooperates with the chamfer 211 of the cutout 22 of the cover 2, wherein on insertion into the cutout 22 the bearing element 4 reaches an end position when the longitudinal stop 421 rests against the chamfer 211. The longitudinal stop 421 hence positively secures the bearing element 4 against being shifted in the direction of movement of the profile (i.e. in direction of extrusion E) out of the cutout 22. In addition, the bearing element 4 can exactly be positioned in axial direction by means of the longitudinal stop 421, so that in particular a bearing bore 45 in the bearing element 4, which should accommodate a trunnion 31 of the guide roller 3, can be brought into the predetermined position. In addition, the longitudinal stop is provided with an inclined approach surface 4211 corresponding to the chamfer 211, so that neither the end face 43 provided with the stop 421 nor the opposed end face 44 of the bearing element 4 protrude from the cover 2.

Of course, the longitudinal stop 421 also might be formed on another side of the bearing element 4 or additional longitudinal stops might be provided. This can be effected in dependence on the acting forces, wherein the usually acting forces do not require any further longitudinal stops. When the cutout 22 has no chamfer, but a rounding, a flute is to be formed instead of the inclined, flat approach surface 4211 of the longitudinal stop 421.

The bearing element 4 shown in FIG. 6 is formed largely symmetrical, so that it can be used both for supporting the guide roller 3 and can be inserted into the cutout 22 present to the left and to the right of the guide roller 3. The bearing bore 45 of the bearing element 4 also can be formed offset (i.e. off-center) in vertical direction (i.e. vertical to the narrower long sides of the bearing element 4). A central positioning of the bore 45 (zero position) serves for supporting the guide roller 3 in the (target) starting position). When the height (vertical to the direction of longitudinal extension of the profile) and/or the pretension of the extruded profile deviates from the target geometry, this deviation can be compensated by raising or lowering the guide roller 3. This can very expediently be effected in that instead of a mechanical remachining of the cover 2 the bearing elements 4 merely are replaced by bearing elements which include a vertically offset bearing bore. At the bearing element 4 shown in FIG. 6, both raising and lowering of the roller 3 can be effected with a bearing bore 45 offset in only one direction (vertically). The bearing element for the right side possibly must be rotated by 180° with respect to that for the left side.

When selecting the material for the bearing element 4, preferred bearing material pairings in particular can be taken into account. In the design of the cover according to FIGS. 1 to 5, the roller 3 is fabricated e.g. of a stainless steel, wherein the trunnion 31 (in particular integrally connected with the roller 3) also can be formed of this steel. A very long-lived support is to be expected when the bearing element 4 is fabricated of a sintered hard metal. In principle, however, all metals such as e.g. gunmetal or bronze alloys, and also plastics can be used.

Figure 7:
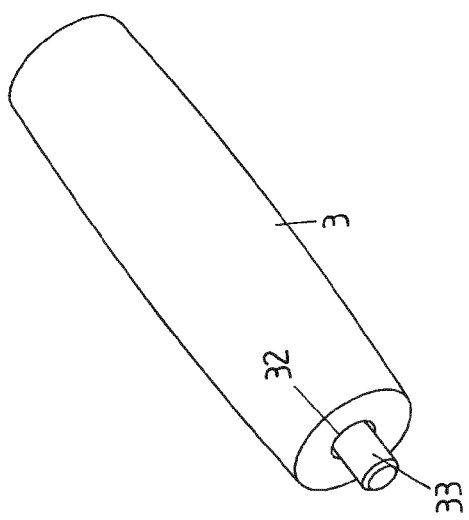
FIG. 7 shows a modification of the guide roller of FIG. 5.

FIG. 7 shows an alternative embodiment of the guide roller 3. In this case, the trunnion is formed by a bearing pin 33 inserted into a frontal bore 32 of the roller. The material of the pin 33 thus can be chosen different from the material of the guide roller 3, wherein in particular different metals can be used. In addition, a standardized dowel pin can be used as bearing pin 33, which is suitable in terms of material hardness and exact, polished surface and is available at low cost as standardized part.

Figure 8:
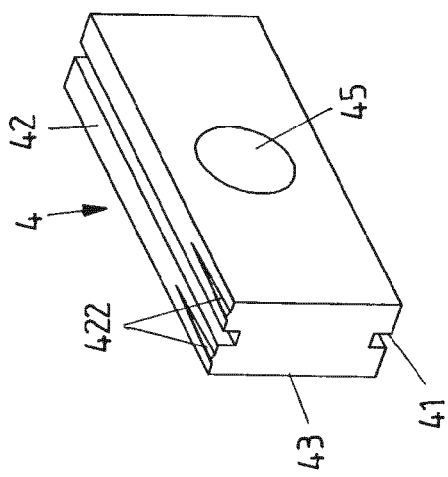
FIG. 8 shows a modification of the bearing element of FIG. 6.

FIG. 8 shows a further configuration of the bearing element 4. Instead of the longitudinal stop 421 (FIG. 6), two wedge-shaped structures in the form of the ribs 422 extending in longitudinal direction of the bearing element 4 protrude from the upper surface 42. The ribs 422 in particular protrude to a comparatively small extent (order of magnitude 0.2 mm maximum height from the upper surface 42), wherein their height tapers off to zero in a wedge-shaped manner in longitudinal direction of the bearing element 4 (in direction of extrusion E). The length of the ribs 422 each can cover the entire length of the bearing element 4 or only a partial region, as is shown in FIG. 8. The design of the ribs 422 as shown in FIG. 8 above all is well suited when the bearing element 4 is sintered of a hard metal, so that the ribs 422 are not leveled out even in the case of a repeated installation and removal of the bearing element 4 into and from the cover 2. For example, this design of the bearing element 4 can be combined with a cutout 22 of the cover 2 without resilient edge portion 222, wherein without spring action a firm seat is achieved in axial direction as a result of a small-scale, plastic deformation of the boundary surfaces of the cutout 22 (in particular the lower and upper boundary surface) of the cover 2.

FIGS. 9 and 10 show a further embodiment of the bearing element 4. At the end of the upper surface 42 of the bearing element 4 directed upstream with respect to the direction of extrusion E (facing the extrusion die) a resilient tongue 423 is provided. The tongue 423 is formed by a region cut free by a cut proceeding from the end face 44. It is conceivable that the groove 41 extends along the upper surface 42 also into the region of the tongue 423. FIG. 9 shows the tongue 423 undeformed in the starting condition, FIG. 10 after insertion into the cutout 22 of the cover 2 in the tensioned (impressed) condition. The slim and relatively long tongue 423 allows elastic bending, so that even after repeated installation and removal of the bearing element 4 into and from the cover 2 its resilience is maintained and an exact positioning of the bearing element 4 and a sufficient non-positive connection between the bearing element 4 and the cover 2 is ensured.

FIG. 11 shows a further modification of the bearing element 4 for a non-positive fixation in the cutout 22 of the cover 2. In this case, the bearing element 4 is curved slightly arc-shaped (in longitudinal direction, i.e. after insertion into the cover 2 in direction of extrusion E), wherein the curvature in particular at least approximately extends along the entire length of the bearing element 4.

When the bearing element 4 is pushed into a cutout 22 in the form of a prismatic groove (i.e. a cutout with inner surfaces substantially parallel to each other and extending in direction of extrusion E), a contact is obtained on three (horizontally extending) lines. According to FIG. 12, the bearing element 4 rests against the inside of the cutout 22 via two lower lines in the region of its two ends and via an upper, central line.

The height of the cutout 22 (transversely to the main direction of extension of the bearing element 4, i.e. measured vertically to the direction of extrusion E) is slightly smaller than the maximum height extension of the bearing element, i.e. than the distance between the region of the maximum deflection (in the region of the ends of the bearing element 4) and of the apex of the bearing element (in the middle of the bearing element 4); cf. FIG. 12, which shows the bearing element 4 inserted into the cutout 22. On insertion of the bearing element 4 into such groove-like cutout 22, the bearing element 4 is slightly bent up and thus pretensioned against the inner surfaces of the cutout, so that the bearing element 4 is clampingly fixed in the cutout 22.

FIG. 13 shows a further embodiment of the bearing element 4. Here, the bearing element 4 is designed purely prismatic in longitudinal direction, i.e. in particular neither has a longitudinal stop nor wedge-shaped ribs. In addition, the bearing element 4 includes a bearing pin 46 which protrudes vertically from the bearing element 4 and serves for supporting the guide roller 3. The bearing pin 46 e.g. is a separate part, which is inserted into a (e.g. central or, as described above, vertically offset) bore 45' of the bearing element 4. It is however also conceivable that the bearing pin 46 likewise is formed integrally with the bearing element 4. The guide roller 3 correspondingly includes no bearing pin, but a bore into which the free (in particular tapered) end of the bearing pin 46 engages.

The use of a separate bearing pin can be advantageous; for example, the cylindrical (usually highly stressed) bearing pin can be manufactured easily and e.g. be sintered of hard metal. In addition, the same geometry of the bearing pin can be used for different configurations of the bearing element and/or the guide roller (in particular those described above); for example, the same bearing pin also can be pressed into a bore of the roller. It also is conceivable that the bearing element 4 itself (usually stressed less strongly than the bearing pin) is formed of another material than the bearing pin; can be fabricated e.g. of a very inexpensive material and for example by a very inexpensive method of plastics or of a die-cast metal alloy, e.g. by injection molding or die casting methods.

The bearing pin also can be connected with the bearing element in various vertical positions, without having to change the remaining structure of the bearing element. For example, the bearing element can be provided with a bore for accommodating an end of the bearing pin, which is formed at the desired (in particular vertical) position.

The bearing material pairing (i.e. the material of the stationary bearing pin and the component of the guide roller via which the support is effected, i.e. in particular of the region of the guide roller in which the bore for accommodating the free end of the bearing pin is formed) also can be chosen largely free of other constraints. For example, the stationary bearing part, the bearing pin "with linear load", is fabricated of a wear-resistant hard metal which corresponds well with the rotating bearing part, the bore in the guide roller "with circumferential load", and the material of the guide roller which e.g. is much softer. For example, the guide roller is formed of a (substantially) softer steel than the bearing pin.

Figure 15:
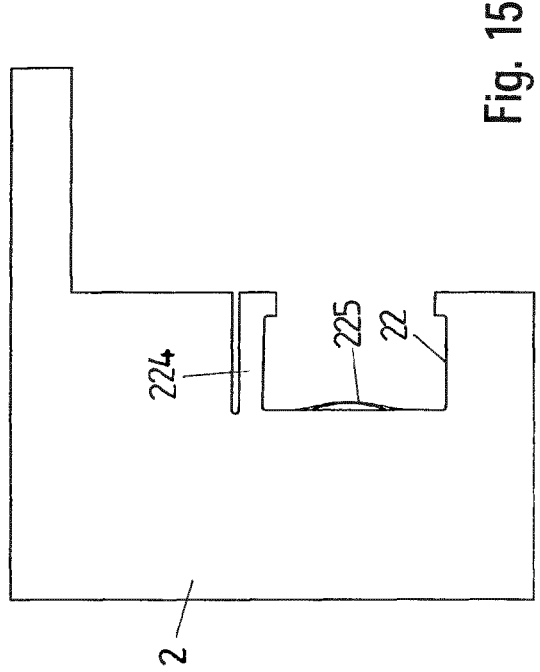
FIG. 15 shows a first enlarged (5:1) detail view of the calibrating element (cover) of FIG. 14A.
Figure 14A:
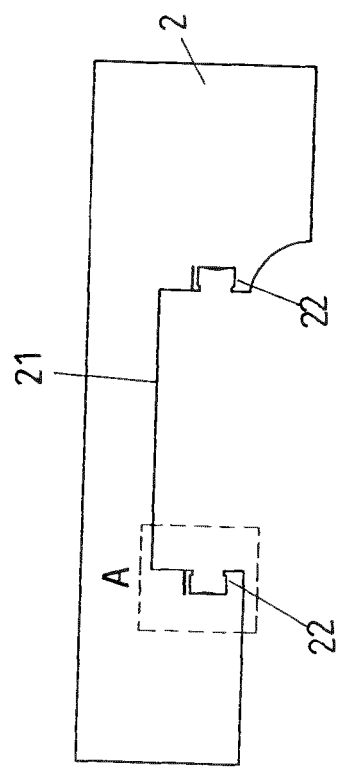
FIGS. 14A and B show different views of a calibrating element (cover), 14A in a top view, 14B in a perspective representation, wherein the rear side of FIG. 14A lies at the top.
Figure 14B:
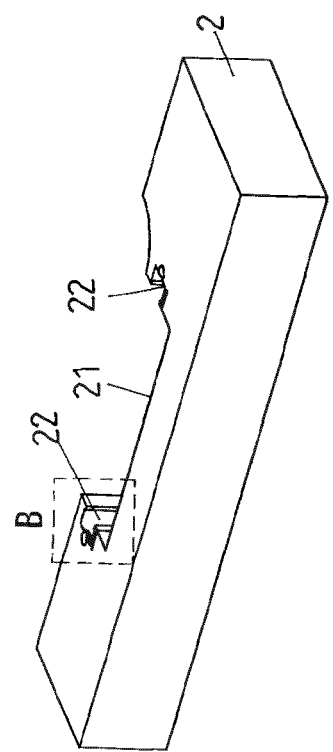

FIGS. 14A and 14B show different views of a part of a calibrating element (cover) 2, which includes two cutouts 22 into which the bearing element of FIG. 13 can be inserted. The left cutout 22 in FIG. 14A is shown enlarged in FIG. 15 (corresponding to region A in FIG. 14A) and the same cutout 22 is shown in a rotated position in FIG. 16 (corresponding to region B in FIG. 14B). Clarification: Both cutouts 22 (the left and the right, in particular are designed at least approximately identical and both include e.g. both a resilient tongue and a longitudinal stop "on the exit side" (relative to the direction of extrusion).

The upper edge of the cutout is formed in the form of a resilient tongue 224 (similar to the lower tongue 222 in FIG. 4), which compensates (inevitable) manufacturing tolerances and ensures an exact positioning and a secure non-positive connection between the bearing element 4 and the cover 2. To the end face 44 of the cover 2 located downstream with respect to the direction of extrusion E a longitudinal stop 225 is integrally molded, which ensures an exact longitudinal positioning of the bearing element 4.

Figure 16:
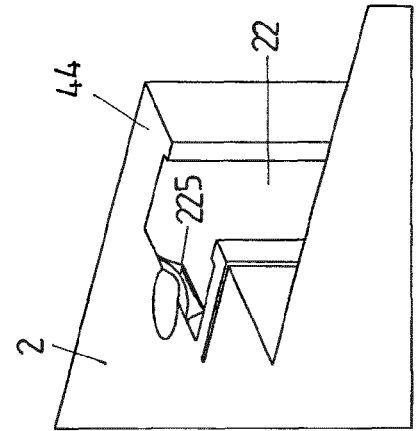
FIG. 16 shows a second enlarged (5:1) detail view of the calibrating element (cover) of FIG. 14B.

A longitudinal stop 225 protruding into the cutout 22, which is formed according to FIG. 16, can be produced in a simple way. For producing the longitudinal stop 225, a hardened insert for example is inserted into the cutout 22 instead of the bearing element 4. With a pressing device or a center punch the material (e.g. the metal) of the edge of the cutout is plastically deformed at the exit-side edge of the cutout, so that the longitudinal stop 225 is formed at the desired position.

FIGS. 17A to 17D show various embodiments of positive and non-positive fixations of the bearing element 4 at the cover 2. According to FIG. 17A a non-positive clamping connection is realized in that a fastening element in the form of a screw 5 reaches through a bore in the cover 2 and urges against an outer surface of the bearing element 4.

According to FIG. 17B, a screw 5 (which e.g. has a conical head) urges against a correspondingly formed center bore in an outer surface (oriented parallel to the direction of extrusion E) of the bearing element, so that a positive and non-positive clamping connection between the bearing element 4 and the cover 2 is obtained.

According to FIG. 17C, a positive and non-positive clamping connection is produced in that a screw 5 is screwed into a threaded bore of the bearing element 4. In addition, a positive longitudinal positioning of the bearing element 4 can be realized in that a screw 5 protrudes into the cutout with its threaded end after a downstream end face (facing away from the extrusion die) of the bearing element 4, so that the screw 5 forms a longitudinal stop for the bearing element 4.

FIG. 18 shows a further variant of the bearing element 4. Into a bore 45 of a base body of the bearing element 4 a bearing sleeve 47 (e.g. of a sintered hard metal or another metal) is inserted as bearing component. The bearing element 4 thus can be manufactured of another (in particular inexpensive) material than the bearing component (the sleeve 47), because the bearing element 4 itself is loaded only little and therefore no particular requirements in terms of wear and friction must be satisfied by the material of the bearing element 4 and the material of the bearing element 4 also need not necessarily fit with the material of the bearing component (e.g. trunnion) on the part of the guide roller 3.

LIST OF REFERENCE NUMERALS 1 calibration device
2 calibrating element (cover)
3 guide roller
4 bearing element
5 screw
21 opening
22 cutout
31 trunnion
32 bore
33 bearing pin
41 groove
42 upper surface
43, 44 end face
45, 45' bore
46 bearing pin
47 bearing sleeve
211 chamfer
221, 222 protrusion
223, 224 resilient tongue
225 longitudinal stop
421 longitudinal stop
422 rib
423 tongue
4211 approach surface

The invention claimed is:

1. A calibration device for a calibration, in particular a wet calibration, of an extrusion device, comprising:
   a calibrating element which includes an opening for guiding through a profile produced by means of an extrusion die of the extrusion device,
   at least one rotatable guide roller which is in contact with the profile when the profile is guided through the opening, and
   at least one separate bearing element insertable into a cutout of the calibrating element, via which the guide roller can rotatably be mounted on the calibrating element,
   wherein at least one trunnion is provided at the guide roller or the bearing element,
   wherein the trunnion engages a bore of the bearing element or the guide roller, respectively,
   wherein an outer diameter of the trunnion is smaller than an inner diameter of the bore,
   wherein the bearing element is one-piece and arranged directly in the cutout of the calibrating element, and
   wherein the bearing element is non-positively fixed at the calibrating element in such a way that shifting of the bearing element in a direction of movement of the profile is counteracted and/or the bearing element includes at least one stop cooperating with an edge or boundary surface of the cutout such that it positively secures the bearing element against being shifted in a direction of extrusion of the profile.

2. The calibration device according to claim 1, wherein the bearing element has at least one wedge-shaped structure which can cooperate with a boundary surface of the cutout such that it non-positively fixes the bearing element at the calibrating element.

3. The calibration device according to claim 1, wherein the bearing element is formed curved, so that with one portion of a first long side and with two portions of a second long side, which is opposed to the first long side, it can rest against an inside of the cutout such that the bearing element is non-positively fixed at the calibrating element.

4. The calibration device according to claim 1, wherein the bearing element includes at least one stop which can cooperate with an edge or boundary surface of the cutout such that it positively secures the bearing element against being shifted in a direction of extrusion of the profile.

5. The calibration device according to claim 1, wherein the calibrating element includes at least one stop via which the bearing element can positively be secured against being shifted in a direction of extrusion of the profile.

6. The calibration device according to claim 1, wherein the bearing element includes a resilient portion which can cooperate with a boundary surface of the cutout such that it non-positively fixes the bearing element at the calibrating element.

7. The calibration device according to claim 1, wherein the calibrating element includes a resilient portion which can act on the bearing element such that the bearing element is non-positively fixed at the calibrating element.

8. The calibration device according to claim 1, further comprising a fastening element penetrating the calibrating element down to the cutout, via which the bearing element can be fixed at the calibrating element.

9. The calibration device according to claim 8, wherein the fastening element with one portion, as seen in a direction of extrusion of the profile, extends behind the bearing element, urges bluntly against the bearing element, protrudes into a counterbore of the bearing element or can be screwed into a threaded bore of the bearing element.

10. The calibration device according to claim 1, wherein to the guide roller the trunnion is integrally molded or a bearing pin is inserted, via which the guide roller can rotatably be mounted on the bearing element.

11. The calibration device according to claim 10, wherein the trunnion or the bearing pin engages into the bore of the bearing element or into a sleeve inserted into the bore of the bearing element.

12. The calibration device according to claim 1, wherein the trunnion is integrally molded to the bearing element or a bearing pin is inserted, wherein the trunnion or the bearing pin engages into a bore of the guide roller or into a sleeve inserted into a bore of the guide roller.

13. The calibration device according to claim 1, wherein a part of the bearing element and/or a part of the guide roller, via which the guide roller can be mounted on the bearing element, is formed of a metal or a plastic material.

14. The calibration device according to claim 1, wherein a part of the bearing element, via which the guide roller can be mounted on the bearing element, is formed of a sintered metal alloy or a sintered hard metal.

15. The calibration device according to claim 1, wherein:
for mounting the guide roller on the bearing element, the trunnion includes a bearing pin and/or a sleeve, and
the bearing pin and/or the sleeve are formed of another material than the guide roller and/or the bearing element.

16. The calibration device according to claim 1, wherein the cutout extends through the calibrating element in a direction of extrusion.

* * * * *